United States Patent
Ono (10) Patent No.: US 7,739,342 B2
(45) Date of Patent: Jun. 15, 2010

(54) IMAGE FORMATION APPARATUS, IMAGE FORMATION METHOD, AND IMAGE FORMATION PROGRAM EMBODIED ON COMPUTER READABLE MEDIUM

(75) Inventor: Tomomi Ono, Akashi (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 242 days.

(21) Appl. No.: 11/950,514

(22) Filed: Dec. 5, 2007

(65) Prior Publication Data

US 2008/0307059 A1 Dec. 11, 2008

(30) Foreign Application Priority Data

Jun. 8, 2007 (JP) .............................. 2007-153256

(51) Int. Cl.
  *G06F 15/16* (2006.01)
  *G06K 15/00* (2006.01)
  *G03G 15/00* (2006.01)
(52) U.S. Cl. ........................ 709/206; 709/207; 709/201; 358/3.23; 399/43
(58) Field of Classification Search ........................ None
See application file for complete search history.

(56) References Cited

U.S. PATENT DOCUMENTS

| 6,026,380 A * | 2/2000 | Weiler et al. .................. 705/34 |
| 7,526,212 B2 * | 4/2009 | Zwiefelhofer .................. 399/8 |
| 2007/0233788 A1 * | 10/2007 | Bender ....................... 709/206 |

FOREIGN PATENT DOCUMENTS

| JP | 2003-099215 (A) | 4/2003 |
| JP | 2004-013632 (A) | 1/2004 |
| JP | 2005-275544 | 10/2005 |

OTHER PUBLICATIONS

Notice of Ground of Rejection in JP 2007-153256 dated Mar. 17, 2009, and an English Translation thereof.

* cited by examiner

*Primary Examiner*—John B. Walsh
(74) *Attorney, Agent, or Firm*—Buchanan Ingersoll & Rooney PC (57) ABSTRACT

In order to print a required number of copies, MFP having an assigned email address includes an email reception portion to receive an email, a number of copies determination portion to determine, based on destination information of the received email, the number of copies of data included in the email to print, and an image formation control portion to print the data included in the email by the determined number of copies.

18 Claims, 11 Drawing Sheets

| USER ID | EMAIL ADDRESS |
|---|---|

FIG. 9

| No. | EMAIL ADDRESS | PRINTING TYPE | PAGE LAYOUT | COLOR SELECTION | STAPLING |
|---|---|---|---|---|---|
| 1 | MFP1_setting1@oooo.jp | DOUBLE-SIDED | NONE | COLOR | TWO PLACES |
| 2 | MFP1_setting2@oooo.jp | DOUBLE-SIDED | 2 in 1 | GRAY SCALE | NONE |
| 3 | MFP1_setting3@oooo.jp | BOOKLET | NONE | COLOR | TWO PLACES |
| 4 | : | : | : | : | : |
| 5 | : | : | : | : | : |

IMAGE FORMATION APPARATUS, IMAGE FORMATION METHOD, AND IMAGE FORMATION PROGRAM EMBODIED ON COMPUTER READABLE MEDIUM

This application is based on Japanese Patent Application No. 2007-153256 filed with Japan Patent Office on Jun. 8, 2007, the entire content of which is hereby incorporated by reference.

BACKGROUND OF THE INVENTION

1. Field of the Invention

The present invention relates to an image formation apparatus, an image formation method, and an image formation program embodied on a computer readable medium, and more particularly to an image formation apparatus capable of receiving emails, an image formation method executed in the image formation apparatus, and an image formation program embodied on computer readable medium.

2. Description of the Related Art

In recent years, so-called MFP (Multi Function Peripheral) including functions of a scanner, a printer, a copier and a facsimile machine has emerged. Japanese Laid-Open Patent Publication No. 2003-99215 discloses a printing method of performing print processing on data attached to an email, when the email is received by MFP having an email address assigned thereto.

However, in the printing method disclosed in Japanese Laid-Open Patent Publication No. 2003-99215, in order to print multiple copies, the number of copies has to be mentioned in the body of an email when the email is created.

On the other hand, Japanese Laid-Open Patent Publication No. 2004-13632 discloses an electronic meeting system connected to a network. The electronic meeting system includes registration means for receiving reservation information concerning a meeting and registering the same. The number of participants in the meeting can be set in the reservation information. The electronic meeting system further includes means for regularly checking whether a meeting material file used in the meeting is received or not and, if the meeting material file is received, preliminarily printing copies of the file according to the number of participants in the meeting before the opening of the meeting.

However, in Japanese Laid-Open Patent Publication No. 2004-13632, when copies of the meeting material file are preliminarily printed according to the number of participants in the meeting before the opening of the meeting, the number of participants in the meeting has be set beforehand. Therefore, when the number of participants in the meeting is erroneously set, it is impossible to print copies of the meeting material file according to the participants in the meeting.

SUMMARY OF THE INVENTION

The present invention is made to solve the aforementioned problems, and an object of the present invention is to provide an image formation apparatus capable of printing the required number of copies.

Another object of the present invention is to provide an image formation method and an image formation program enabling printing of the required number of copies.

In order to achieve the aforementioned objects, in accordance with an aspect of the present invention, an image formation apparatus having an assigned email address includes: a reception portion to receive an email; a number of copies determination portion to determine, based on destination information of the received email, a number of copies of data included in the email to print; and a print portion to print the data included in the email by the determined number of copies.

In accordance with another aspect of the present invention, an image formation method includes the steps of: receiving an email; determining, based on destination information of the received email, a number of copies of data included in the email to print; and printing the data included in the email by the determined number of copies.

In accordance with a further aspect of the present invention, an image formation program embodied on a computer readable medium causes a computer to execute processing including the steps of: receiving an email; determining, based on destination information of the received email, a number of copies of data included in the email to print; and printing the data included in the email by the determined number of copies.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the figures. In the following description, the same parts are denoted with the same reference characters. Their names and functions are also the same. Therefore, a detailed description thereof will not be repeated.

First Embodiment

Figure 1:
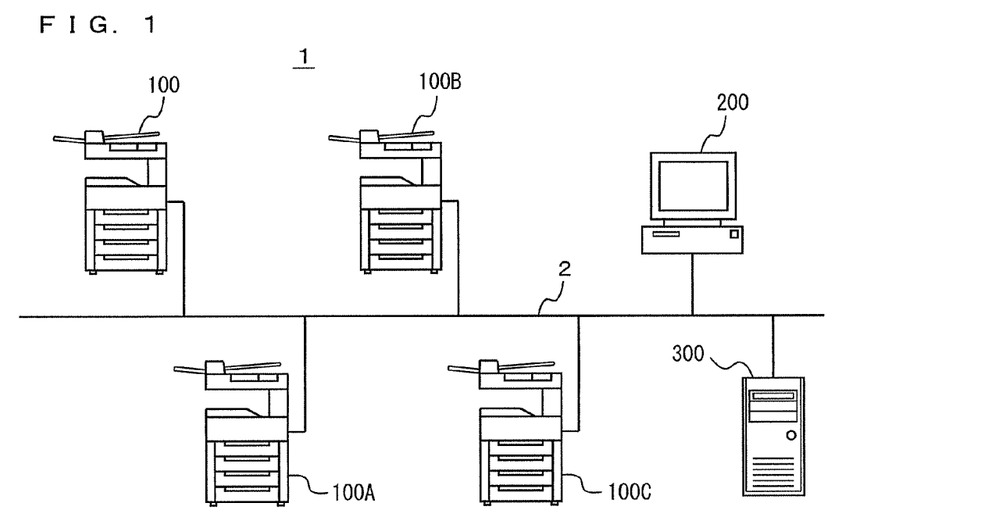
FIG. 1 is an overall schematic diagram showing a print system in an embodiment of the present invention.

FIG. 1 is an overall schematic diagram showing a print system in an embodiment of the present invention. Referring to FIG. 1, a print system 1 includes Multi Function Peripherals (referred to as "MFP" hereinafter) 100, 100A, 100B, 100C as image processing apparatuses, a personal computer (referred to as "PC" hereinafter) 200, and an email server 300, each connected to a network 2. The hardware configuration and function of PC 200 and email server 300 are well known and therefore description thereof will not be repeated here.

An email program is installed in PC 200 for creating, transmitting, receiving and viewing emails. Furthermore, each of MFPs 100, 100A, 100B, 100C has an email address assigned thereto and is installed with an email transmission/reception program for transmitting/receiving emails. Each of MFPs 100, 100A, 100B, 100C makes an inquiry about emails to email server 300 at prescribed time intervals, and, if an email has reached the apparatus, receives the email from email server 300.

In this embodiment, MFPs (Multi Function Peripheral) 100, 100A, 100B, 100C are described as an example of an image processing apparatus. However, MFPs 100, 100A, 100B, 100C may be replaced by an apparatus including a function of forming images, for example, such as a printer, a facsimile, or a personal computer.

Network 2 is a local area network (LAN) and the form of connection can be fixed-line or wireless. In addition, network 2 is not limited to a LAN and can be a wide area network (WAN), a public switched telephone network (PSTN), the Internet, and so on. Here, one PC 200 is used, by way of example, although a plurality of PCs may be used.

Each of MFPs 100, 100A, 100B, 100C has the same function, and the configuration of MFP will be described, taking MPF 100 as an example.

Figure 2:
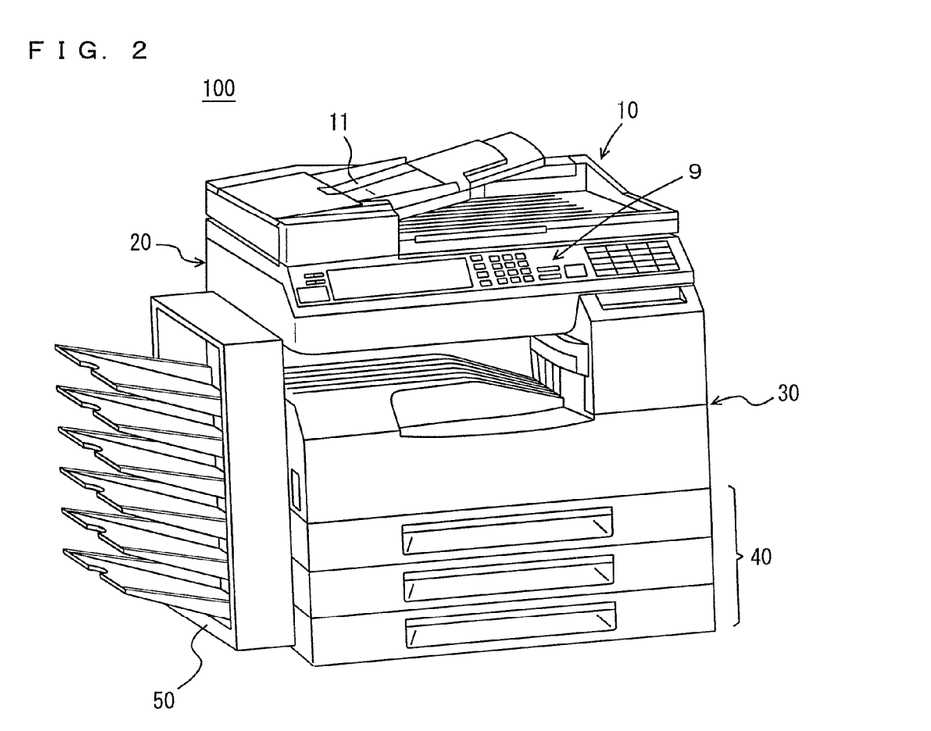
FIG. 2 is an external perspective view of MFP.

FIG. 2 is an external perspective view of MFP 100. Referring to FIG. 2, MFP 100 includes an automatic document feeder (ADF) 10, an image reading portion 20, an image formation portion 30, a paper-feeding portion 40, a post-processing portion 50, and an operation panel 9. ADF 10 conveys a document having a number of pages placed on a document plate 11, one by one in order, to image reading portion 20. Image reading portion 20 optically reads image information such as photographs, characters and pictures from the document to obtain image data.

Image formation portion 30 receives image data to form an image on a sheet of paper based on the image data. Image formation portion 30 forms color images using toner in four colors, namely, cyan, magenta, yellow and black. Image formation portion 30 also forms monochrome images using toner in one color of the four colors of cyan, magenta, yellow and black. Paper-feeding portion 40 stores sheets of paper and supplies the stored sheets one by one to image formation portion 30. Post-processing portion 50 discharges a sheet of paper having an image formed thereon. Post-processing portion 50 has a plurality of paper-discharge trays to allow recording sheets to be sorted and discharged. Post-processing portion 50 additionally includes a punched-hole processing portion and a stapling processing portion to allow a punched-hole process or a stapling process to be performed on the discharged recording sheet.

Figure 3:
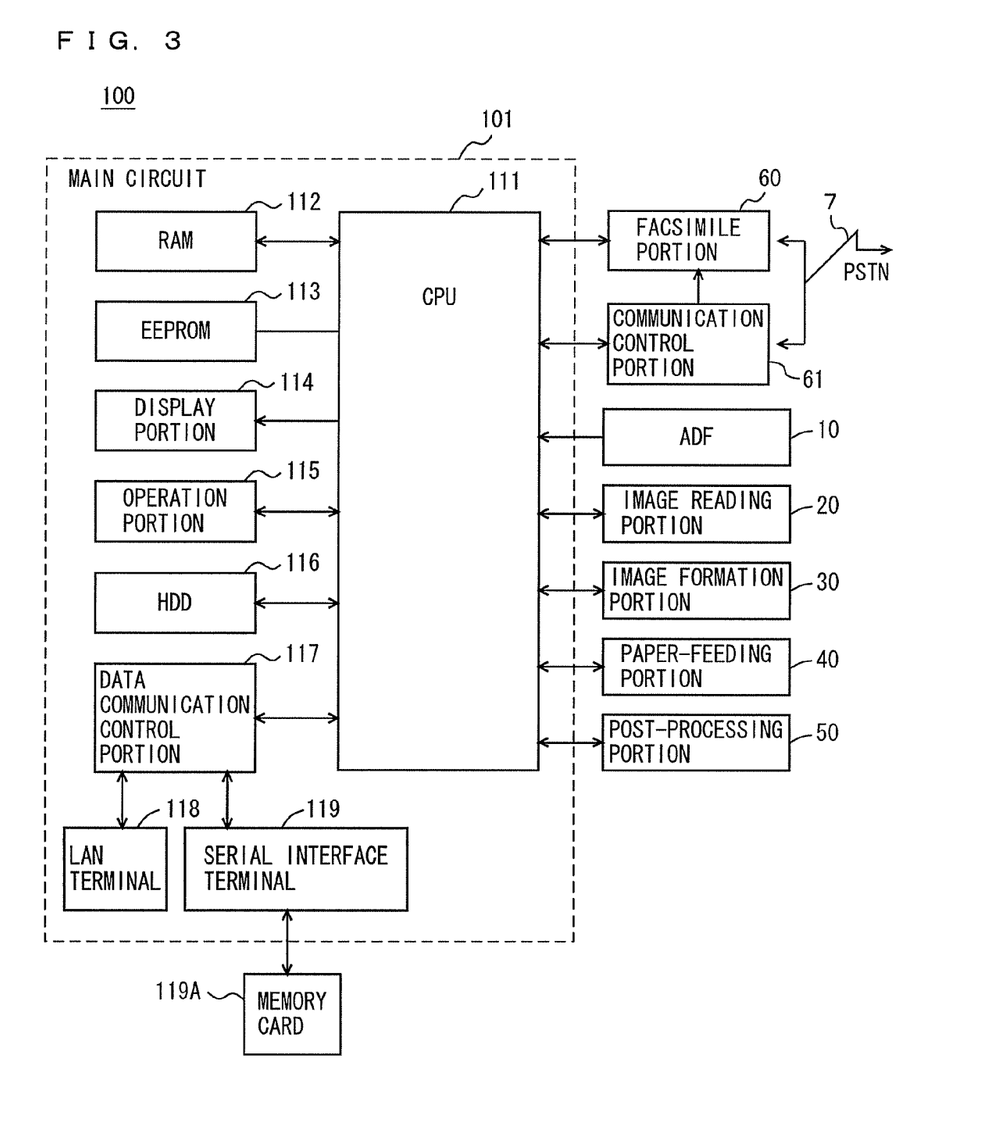
FIG. 3 is a block diagram showing an exemplary hardware configuration of MFP.

FIG. 3 is a block diagram showing an exemplary hardware configuration of MFP. With reference to FIG. 3, MFP 100 includes a main circuit 101. Main circuit 101 is connected to a facsimile portion 60, a communication control portion 61, ADF 10, image reading portion 20, image formation portion 30, paper-feeding portion 40, and post-processing portion 50. Main circuit 101 includes a central processing unit (CPU) 111, a RAM (Random Access Memory) 112 used as a work area for CPU 111, an EEPROM (Electronically Erasable Programmable Read Only Memory) 113 for storing a program executed by CPU 111 and the like, a display portion 114, an operation portion 115, a hard disk drive (HDD) 116 as a mass storage device, and a data communication control portion 117. CPU 111 is connected to each of display portion 114, operation portion 115, HDD 116 and data communication control portion 117 to control main circuit 101 as a whole. In addition, CPU 111 is connected to facsimile portion 60, communication control portion 61, ADF 10, image reading portion 20, image formation portion 30, paper-feeding portion 40, and post-processing portion 50 to control MFP 100 as a whole.

Display portion 114 is a display such as a liquid crystal display (LCD) or an organic ELD (Electro-Luminescence display) to display instruction menus for the user, information about the obtained image data, and the like. Operation portion 115 includes a plurality of keys and accepts inputs of a variety of instructions and data such as characters and numerals by the user's operations corresponding to keys. Operation portion 115 includes a touch-panel provided on display portion 114. Display portion 114 and operation portion 115 constitute operation panel 9.

Data communication control portion 117 has a LAN terminal 118 which is an interface for communications via a communication protocol such as TCP (Transmission Control Protocol) or UDP (User Datagram Protocol), and a serial communication interface terminal 119 for serial communications. Data communication control portion 117 transmits/receives data to/from external equipment connected to LAN terminal 118 or serial communication interface terminal 119, according to an instruction from CPU 111.

A LAN cable for connecting to a network is connected to LAN terminal 118. Data communication control portion 117 communicates with email server 300 connected through LAN terminal 118 to transmit/receive emails to/from email server 300.

CPU 111 controls data communication control portion 117 to read a program executed by CPU 111 from a memory card 119A and store the read program into RAM 112 for execution. It is noted that a recording medium storing a program executed by CPU 111 is not limited to memory card 119A and may be a medium such as a flexible disk, a cassette tape, an optical disk (CD-ROM (Compact Disc-Read Only Memory)/MO (Magnetic Optical Disc/MD (Mini Disc)/DVD (Digital Versatile Disc)), an IC card, an optical card, or a semiconductor memory such as a mask ROM, EPROM (Erasable Programmable ROM), or EEPROM (Electronically EPROM). Alternatively, CPU 111 may download a program from a computer connected to the Internet for storage into HDD 116, or a computer connected to the Internet may write a program into HDD 116 so that the program stored in HDD 116 is loaded into RAM 112 and executed by CPU 111. The program referred to herein includes not only a program directly executable by CPU 111 but also a source program, a compressed program, an encrypted program, and the like.

Communication control portion 61 is a modem for connecting CPU 111 to a PSTN (Public Switched Telephone Networks) 7. A telephone number in PSTN 7 is assigned to MFP 100 beforehand, and when a call is originated from a facsimile machine connected to PSTN 7 to the telephone number assigned to MFP 100, communication control portion 61 detects the call. Upon detection of the call, communication control portion 61 establishes a call to allow facsimile portion 60 to communicate.

Facsimile portion 60 is connected to PSTN 7 to transmit facsimile data to PSTN 7 or receive facsimile data from PSTN 7. Facsimile portion 60 converts the received facsimile data into print data that can be printed in image formation portion 30 and outputs the converted data to image formation portion 30. Accordingly, image formation portion 30 prints the facsimile data received from facsimile portion 60 on a recording sheet. In addition, facsimile portion 60 converts the data stored in HDD 116 into facsimile data and transmits the converted data to a facsimile machine connected to PSTN 7 or other MFPs. Thus, the data stored in HDD 116 can be output to a facsimile machine or other MFPs. In this manner, MFP 100 has a facsimile transmission/reception function.

Figure 4:
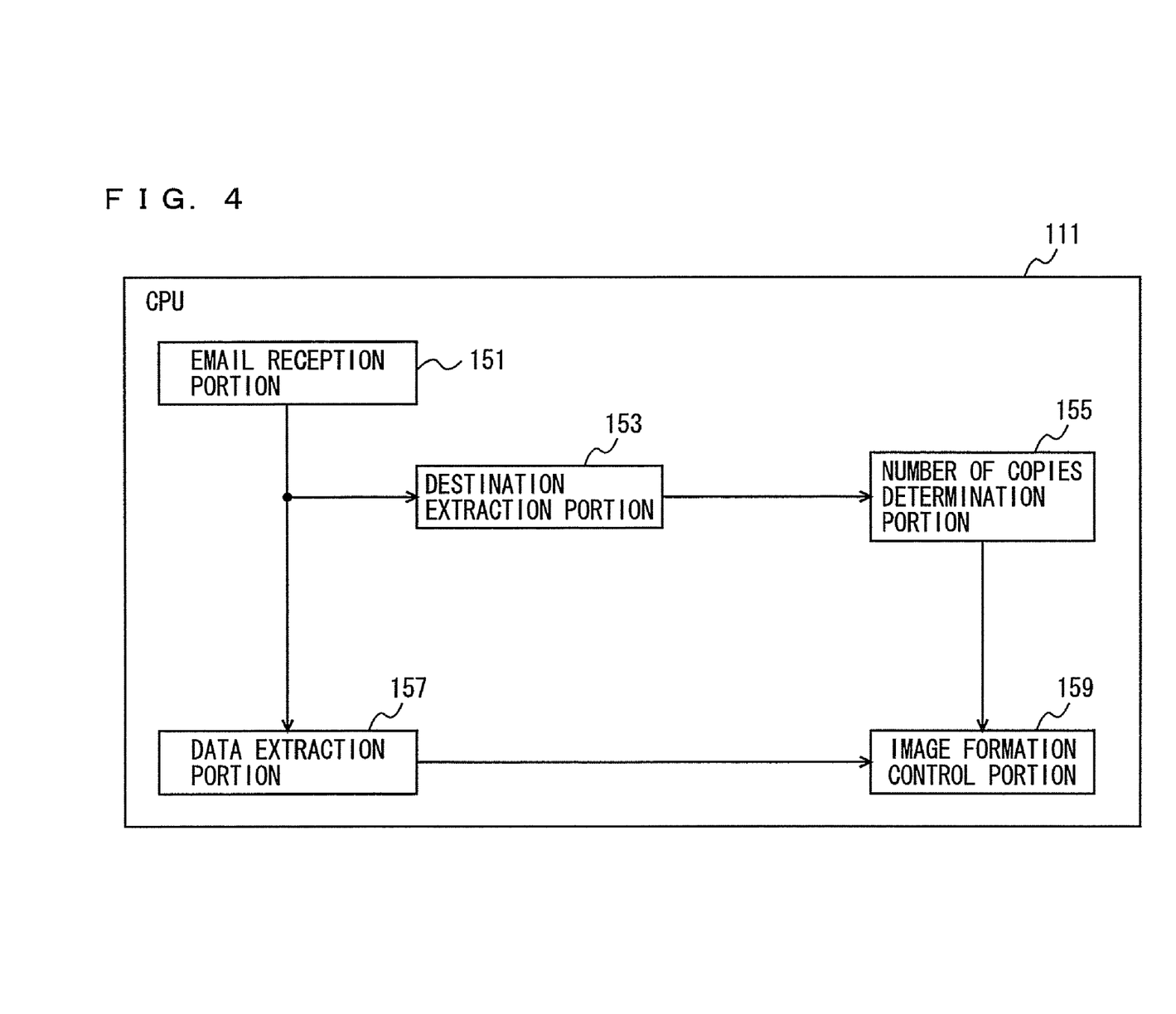
FIG. 4 is a functional block diagram showing an overall function of CPU included in MFP.

FIG. 4 is a functional block diagram showing an overall function of CPU included in MFP. Referring to FIG. 4, CPU 111 includes an email reception portion 151 for receiving emails, a destination extraction portion 153 for extracting destination information from emails, a number of copies determination portion 155 for determining the number of copies based on destination information, a data extraction portion 157 for extracting data attached to an email from the email, and an image formation control portion 159 for controlling image formation portion 30.

Email reception portion 151 receives an email including an email address assigned to MFP 100 as a recipient address from email server 300. When a plurality of email addresses are assigned to MFP 100, all the emails including any one of a plurality of email addresses as a recipient address are received from email server 300. Email reception portion 151 outputs the received email to destination extraction portion 153 and data extraction portion 157.

Destination extraction portion 153 extracts the email address set as a recipient address of the email. The recipient address includes a recipient address with a black carbon copy attribute. It may be determined, according to the setting stored in MFP 100 beforehand, whether or not a recipient address with a black carbon copy attribute is included in the recipient address extracted by destination extraction portion 153. Destination extraction portion 153 outputs the extracted email address to number of copies determination portion 155 and printing setting determination portion 161. Destination extraction portion 153 analyzes the header of the email and, if the email is a reply mail, discards the email as it is without extracting the destination.

Number of copies determination portion 155 counts the number of email addresses included in the input destination information and determines the value obtained by subtracting 1 from the counted value, as the number of copies. The reason for subtracting 1 is that the email address assigned to MFP 100 is included in the destination information. Number of copies determination portion 155 outputs the determined number of copies to image formation control portion 159.

Data extraction portion 157 extracts data attached to an email from the email. When multiple pieces of data are attached, all of the multiple pieces of data are extracted. Data extraction portion 157 outputs the extracted data to image formation control portion 159.

Image formation control portion 159 controls image formation portion 30 to print the data input from data extraction portion 157 by the number of copies input from number of copies determination portion 155.

Figure 5:
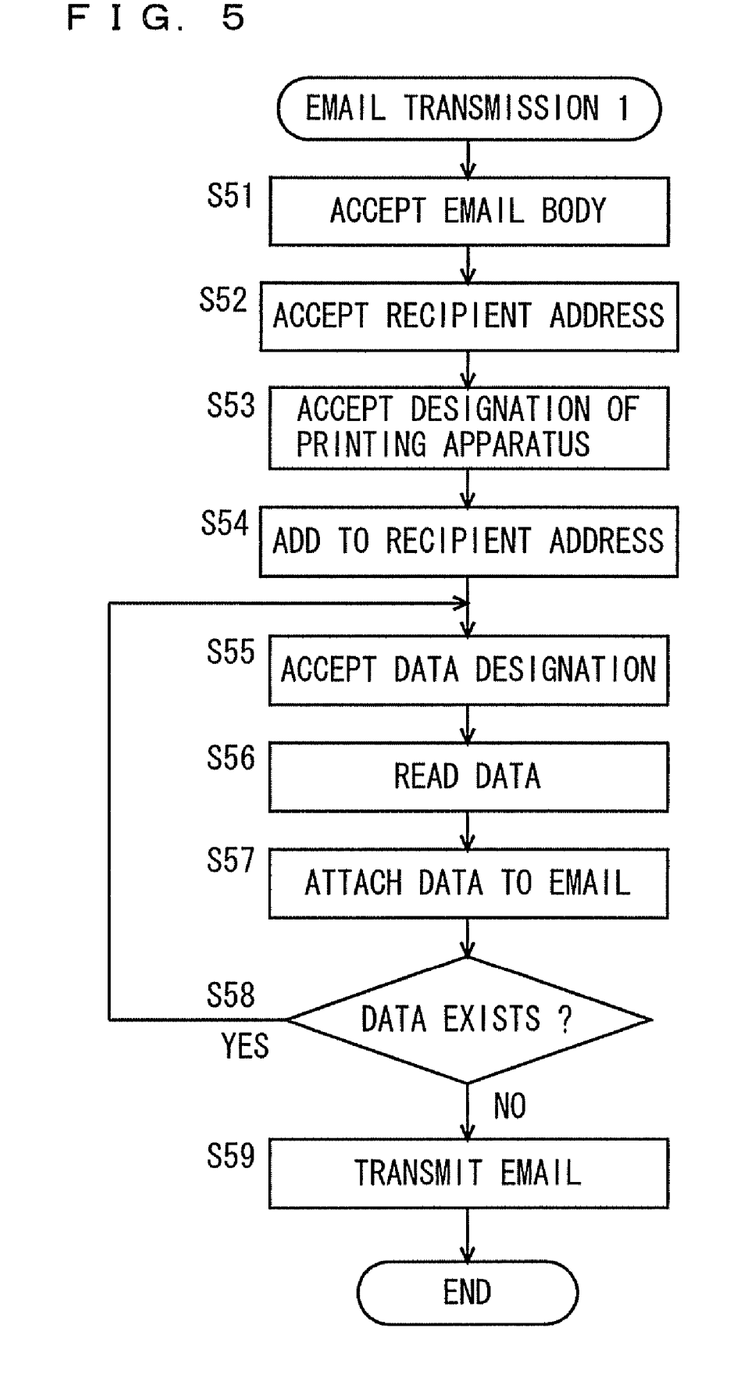
FIG. 5 is a first flowchart showing an exemplary flow of an email transmission process.

FIG. 5 is a first flowchart showing an exemplary flow of an email transmission process. The email transmission process is a process executed by CPU included in PC 200 by CPU included in PC 200 executing an email program. Here, an announcement of a meeting is set in the body of an email, electronic data as distribution materials for the meeting is attached as an attached file, and an email address assigned to a user participating in the meeting is set as a recipient address, by way of example.

Referring to FIG. 5, CPU of PC accepts an email body (step S51). The email body is here an announcement of a meeting. When a user inputs the body of an email to an input device such as a keyboard of PC, the body of the email is accepted from the input device.

Next, a recipient address is accepted. When the user inputs an email address assigned to a user participating in the meeting, to the input device of PC, the email address is accepted as a recipient address of the email from the input device. Here, if an address book storing email addresses beforehand is stored in PC, the user may designate the email address stored in the address book by the input device so that the designated email address is accepted as a recipient address. When a plurality of email addresses are accepted, the accepted plurality of email addresses are accepted as recipient addresses.

Then, designation of a printing apparatus is accepted (S53). Here, MFP 100 is designated as a printing apparatus, by way of example. PC 200 stores the email address assigned to MFP 100 beforehand, and when MFP 100 is designated as a printing apparatus, the email address assigned to MFP 100 is read and added to the recipient address of the email (step S54). Here, in stead of designating a printing apparatus, at step S52, an email address assigned to a printing apparatus may be accepted. In this case, the processes in step S53 and step S54 are not necessary.

Next, designation of data attached to the email is accepted (step S55). The file name of electronic data as distribution materials for the meeting is accepted. Then, the designated data is read (step S56). Data specified by the file name is read from a recording medium such as HDD. Then, the read data is set as an attached file to the email (step S57). Next, it is determined whether or not there exists data designated as an attached file (step S58). If an instruction indicating that there is no attached file is accepted by the user, the process proceeds to step S59. If not, the process returns to step S55.

In step S59, the email is transmitted to email server 300. Accordingly, the email is accumulated in email server 300 and then accumulated in a mail box directed to the email address set as a recipient address. The email can thereafter be downloaded from the mail box. Since the recipient address includes the email address assigned to MFP 100, the email is accumulated in the mail box assigned to MFP 100 in email server 300.

Figure 6:
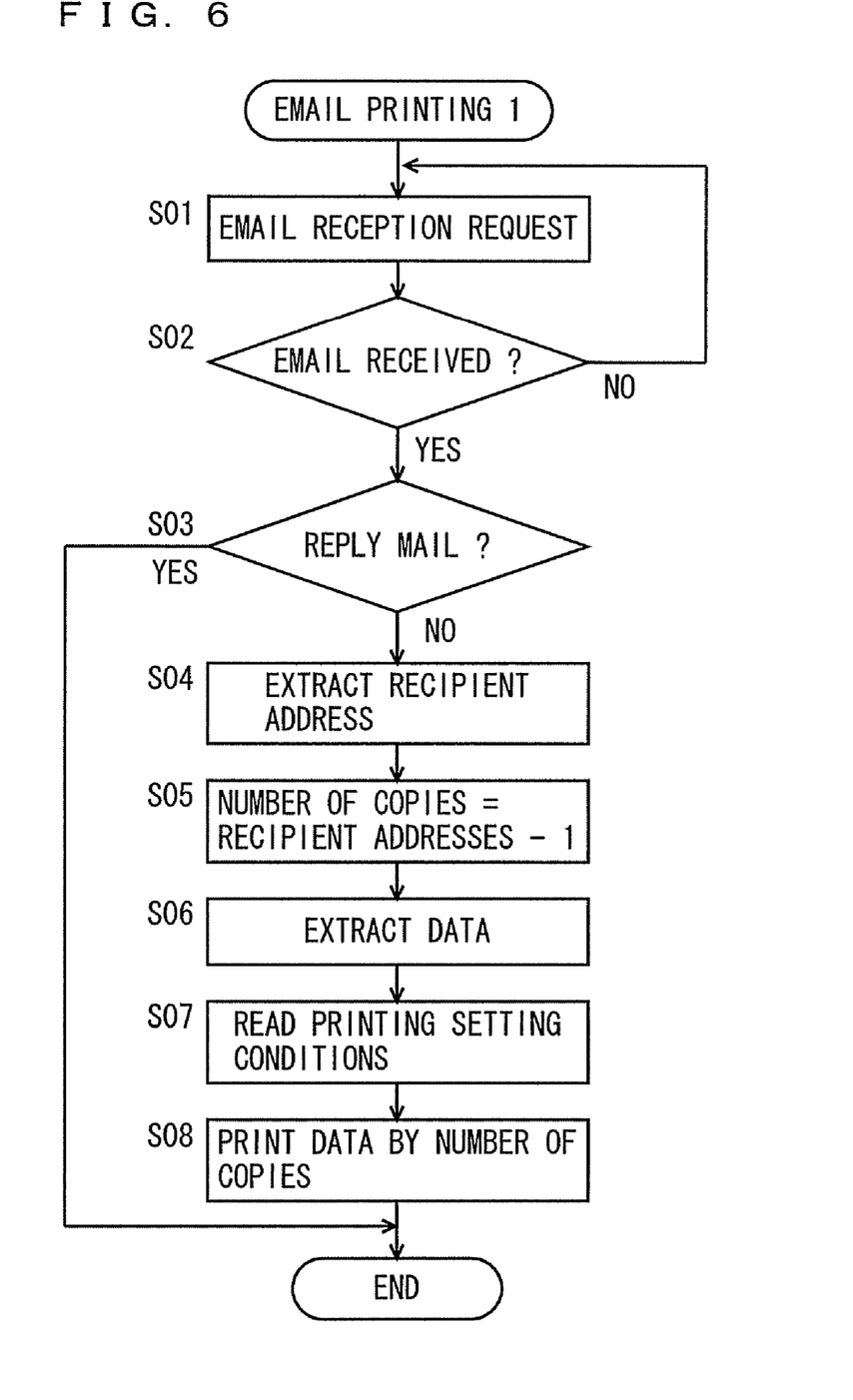
FIG. 6 is a first flowchart showing an exemplary flow of an email printing process.

FIG. 6 is a first flowchart showing an exemplary flow of an email printing process. The email printing process is a process executed by CPU 111 by CPU 111 of MFP 100 executing an image formation program. Referring to FIG. 6, CPU 111 transmits an email reception request to email server 300 (step S01). The reception request includes the email address assigned to MFP 100. CPU 111 transmits an email reception request at prescribed time intervals.

Next, it is determined whether or not an email is received from email server 300 (step S02). If emails are accumulated in the mail box assigned to the email address included in the reception request, email server 300 transmits the accumulated email to MFP 100 which has transmitted the reception request. If CPU 111 receives an email, the process proceeds to step S03, and if not, the process returns to step S01.

In step S03, it is determined whether or not the received email is a reply mail. Whether a reply mail or not is determined by referring to the header information of the email. If a reply mail, the process ends, and if not a reply mail, the process proceeds to step S04. If a reply mail, the email is not the one having attached data to be printed. Thus, useless printing of the attached data can be prevented.

In step S04, the recipient address is extracted from the email. Then, the value obtained by subtracting 1 from the number of the recipient addresses is set as the number of copies (step S05). Then, data attached to the email is extracted (step S06). If multiple pieces of data are attached, all the attached data are extracted. Then, a printing setting condition is read (step S07). Here, a default printing setting condition preset in MFP 100 is read.

Then, the data extracted in step S06 is printed according to the printing setting condition, by the number of copies determined in step S05. Since email addresses respectively assigned to the participants in the meeting are set as recipient addresses of the email, the distribution materials are printed by MFP 100, by the number of copies equal to the number of participants in the meeting.

Therefore, distribution materials are printed by MFP 100 by the number of participants in the meeting by transmitting the email having data of the distribution materials attached thereto to the participants in the meeting and to MFP 100, so that the user need not separately perform an operation of instructing MFP 100 to print, in addition to an operation of transmitting an email. On the other hand, when an instruction to print is given to MFP 100, the number of copies has to be determined by counting the participants in the meeting, and data to be printed by MFP 100 has to be designated. Therefore, data to be printed and the number of copies need not be designated for MFP, thereby preventing erroneous selection of data to be printed and a mistake in the number of copies to be printed.

<First Modification>

A modification of print system 1 will now be described. In the foregoing print system 1, an email is transmitted to one MFP 100, and printing is done only in MFP 100. In print system 1 in the modification, an email is transmitted to a plurality of MFPs to allow each of a plurality of MFPs to print. Here, an email is transmitted to MFPs 100, 100A, by way of example.

Figure 7:
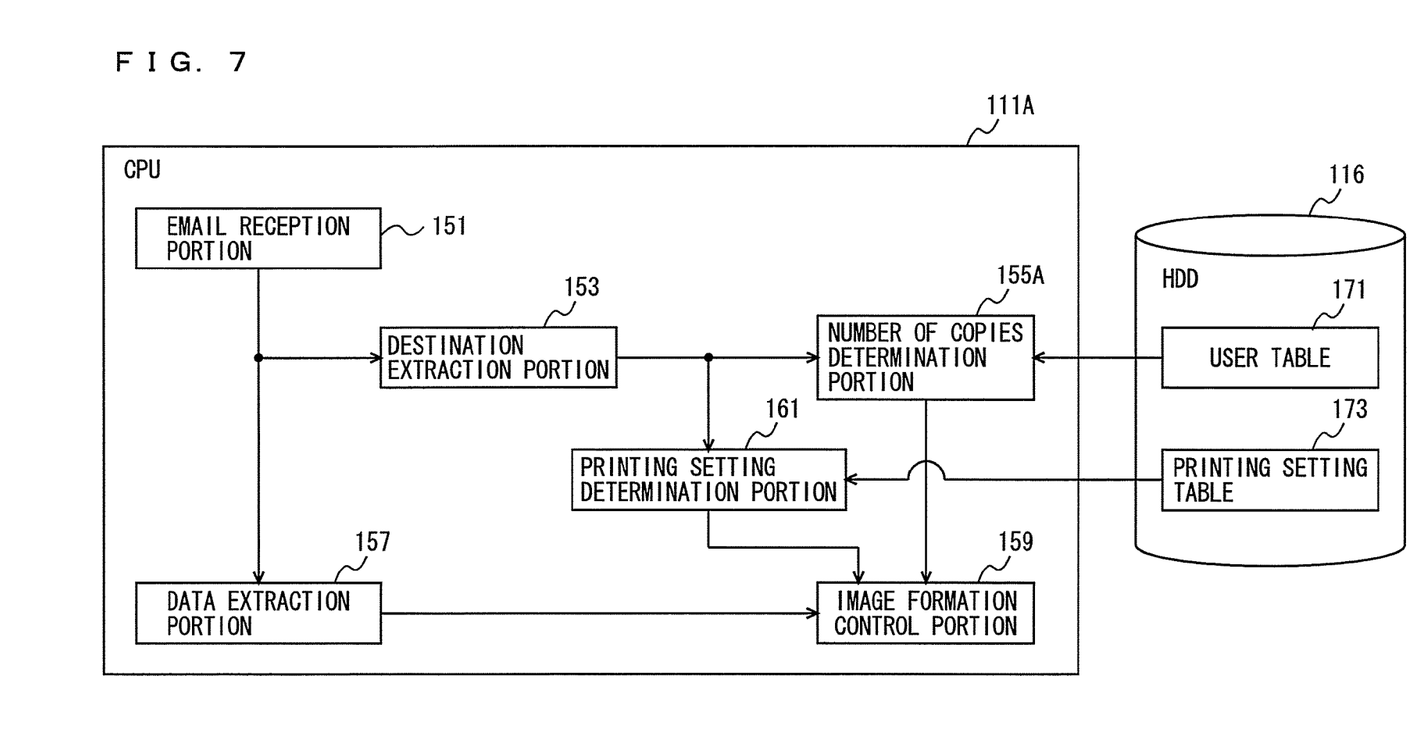
FIG. 7 is a functional block diagram showing an overall function of CPU included in MFP in a first modification together with data stored in HDD.

FIG. 7 is a functional block diagram showing an overall function of CPU included in MFP in a first modification together with data stored in HDD. Referring to FIG. 7, a CPU 111A in the modification includes email reception portion 151 for receiving emails, destination extraction portion 153 for extracting destination information from emails, a number of copies determination portion 155A for determining the number of copies based on destination information, data extraction portion 157 for extracting data attached to an email from the email, image formation control portion 159 for controlling image formation portion 30, and printing setting determination portion 161 for determining a printing setting based on the received email.

Figure 8:
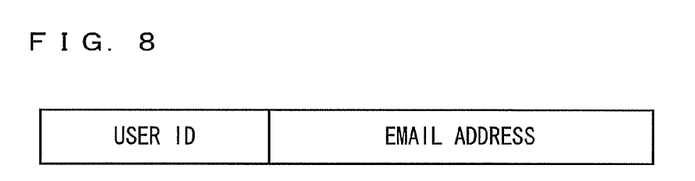
FIG. 8 is a diagram showing an exemplary format of a user table.

A user table and a printing setting table are stored in HDD 116. FIG. 8 is a diagram showing an exemplary format of the user table. Referring to FIG. 8, the user table includes a user record comprised of a user ID and an email address. The user ID is identification information for identifying a user, and a code unique to each user is assigned. The email address included in the user record is an email address assigned to the user of the user ID.

The user table includes user records corresponding to the number of users using MFP 100. Users using MFPs 100, 100A, 100B, 100C can be registered in the respective MFP. For example, the user table stored by MFP 100 includes a user record for each user registered in MFP 100. The user registered in each of MFP 100, 100A, 100B, 100C is preferably, for example, a user who is present for a relatively long time in a geometrically fixed range such as a room or a building where each of MFPs 100, 100A, 100B, 100C is installed. For example, if MFP 100 is installed in each department of a company, the user registered in MFP 100 is a member of the department in which MFP 100 is installed.

Figure 9:
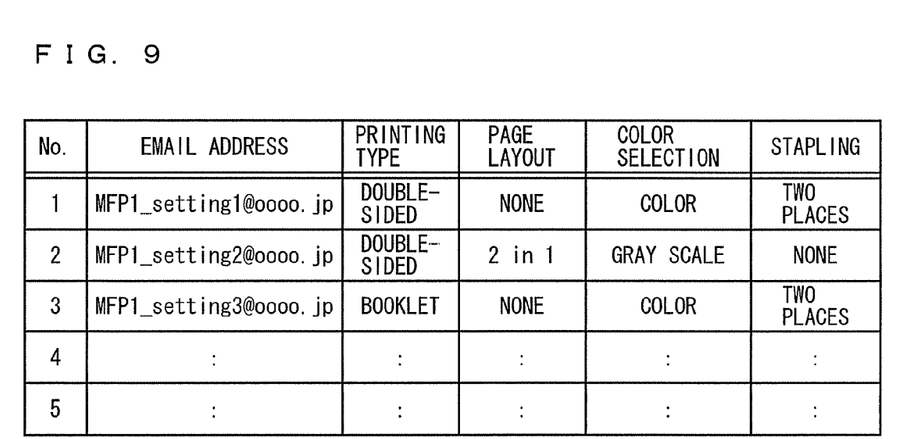
FIG. 9 is a diagram showing an exemplary printing setting table.

FIG. 9 is a diagram showing an exemplary printing setting table. Referring to FIG. 9, the printing setting table includes a printing setting record associating an email address with printing setting conditions. The printing setting table includes one or more printing setting records. The email address included in the printing setting record is the email address assigned to MFP 100. If a plurality of email addresses are assigned to MFP 100, the printing setting table includes the printing setting records by the number of email addresses assigned to MFP 100.

The printing setting conditions here include the settings of a printing type, a page layout, a color selection, and the presence/absence of stapling. Therefore, when the printing setting table includes a plurality of printing setting records, the printing setting information different from each other can be associated with a plurality of email addresses.

Returning to FIG. 7, destination extraction portion 153 extracts the email address set as a recipient address of the email and outputs the extracted email address to number of copies determination portion 155A and printing setting determination portion 161. The recipient address includes a recipient address having a black carbon copy attribute. In addition, it may be determined, according to the settings stored beforehand in MFP 100, whether or not a recipient address having a black carbon copy attribute is included in the recipient address to be extracted by destination extraction portion 153. Destination extraction portion 153 analyzes the header of the email and, if the email is a reply mail, discards the email as it is without extracting the destination.

Number of copies determination portion 155A determines whether or not an email address identical to the input email address is stored in user table 171 by referring to user table 171. Among the input email addresses, the total number of email addresses having the identical email addresses stored in user table 171 is determined as the number of copies. Number of copies determination portion 155A outputs the determined number of copies to image formation control portion 159.

Printing setting determination portion 161 extracts the email address assigned to MFP 100 from the email input from destination extraction portion 153. Then, the printing setting conditions are determined based on the extracted email address. Specifically, the printing setting record including the extracted email address is extracted from printing setting table 173, and the printing setting conditions included in the extracted printing setting record are determined as printing setting conditions for printing. Then, the determined printing setting conditions are output to image formation control portion 159.

Image formation control portion 159 controls image formation portion 30 to print the data input from data extraction portion 157 by the number of copies input from number of copies determination portion 155, according to the printing setting conditions input from printing setting determination portion 161.

Figure 10:
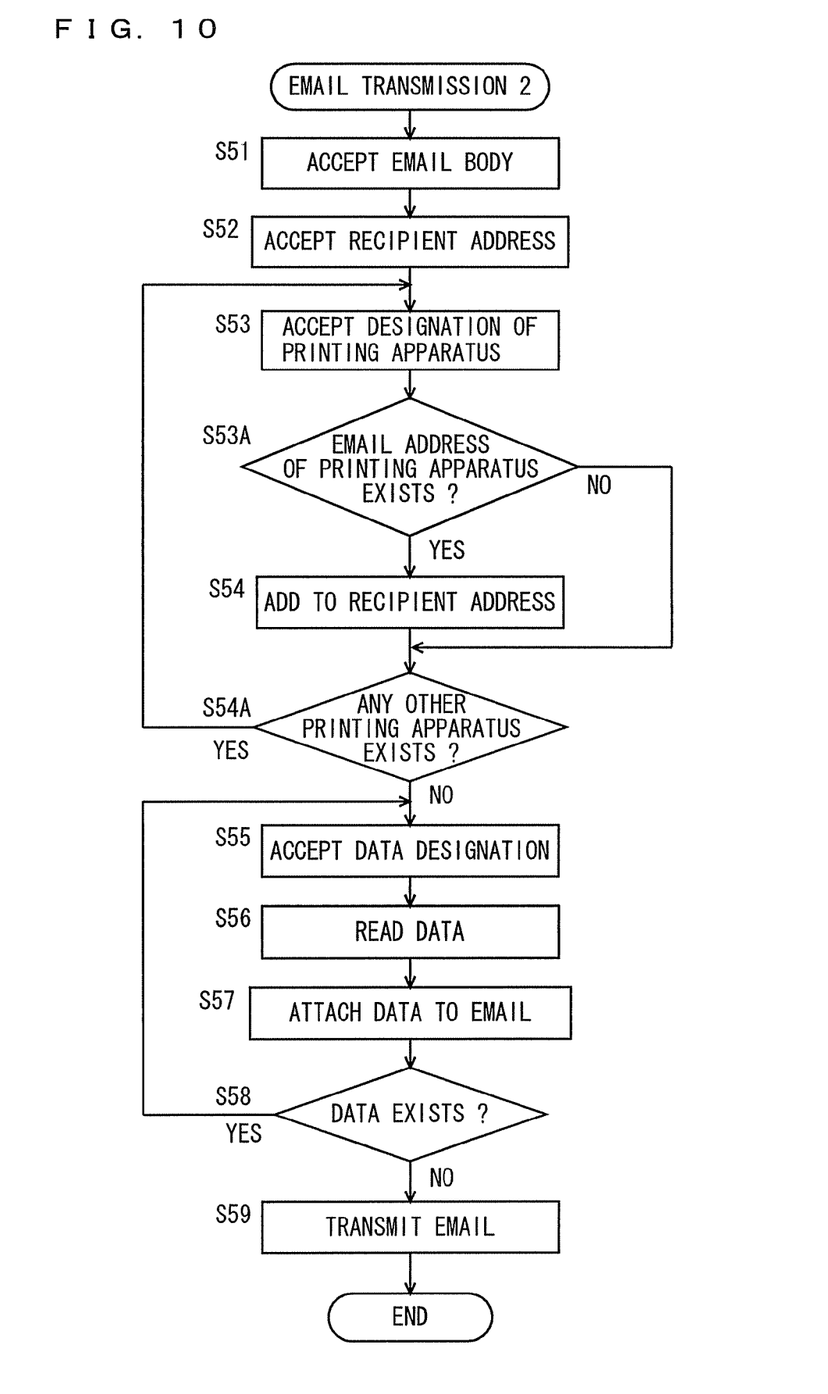
FIG. 10 is a second flowchart showing an exemplary flow of an email transmission process.

FIG. 10 is a second flowchart showing an exemplary flow of an email transmission process. Referring to FIG. 10, the second flowchart differs from the first flowchart of the email transmission process shown in FIG. 5 in that step S53A is added between step S53 and step S54 and in that step S54A is added between step S54 and step S55. In the following, the points different from the first flowchart of the email transmission process shown in FIG. 5 will mainly be described. In step S53, designation of a printing apparatus is accepted (step S53). In the next step S53A, it is determined whether or not the email address of the designated printing apparatus is stored. If the email address of the designated printing apparatus is stored, the process proceeds to step S54, and if not stored, the process proceeds to step S54A. In step S54, the email address of the designated printing apparatus is read and added to the recipient address of the email (step S54). In the next step S54A, it is determined whether or not there exists another apparatus designated as a printing apparatus. It is determined whether or not the user designates a printing apparatus. If another printing apparatus is designated, the process returns to step S53A, and if not, the process proceeds to step S55.

Here, PC 200 stores the respective email addresses of MFPs 100, 10A, 100B, 100C as printing apparatuses, and MFP 100 and MFP 100A are designated as printing apparatuses, by way of example. For example, if the participants in a meeting include a member of a department in which MFP 100 is set and a member of a department in which MFP 100A is installed, MFP 100 and MFP 100A are designated as printing apparatuses. In step S53, MFP 100 is designated and the email address assigned to MFP 100 is then added to the recipient address, and in step S53 subsequently executed, MFP 100A is designated and the email address assigned to MFP 100A is then added to the recipient address.

Therefore, when an email is transmitted in step S59, the same email is received by each of MFPs 100 and 100A.

Figure 11:
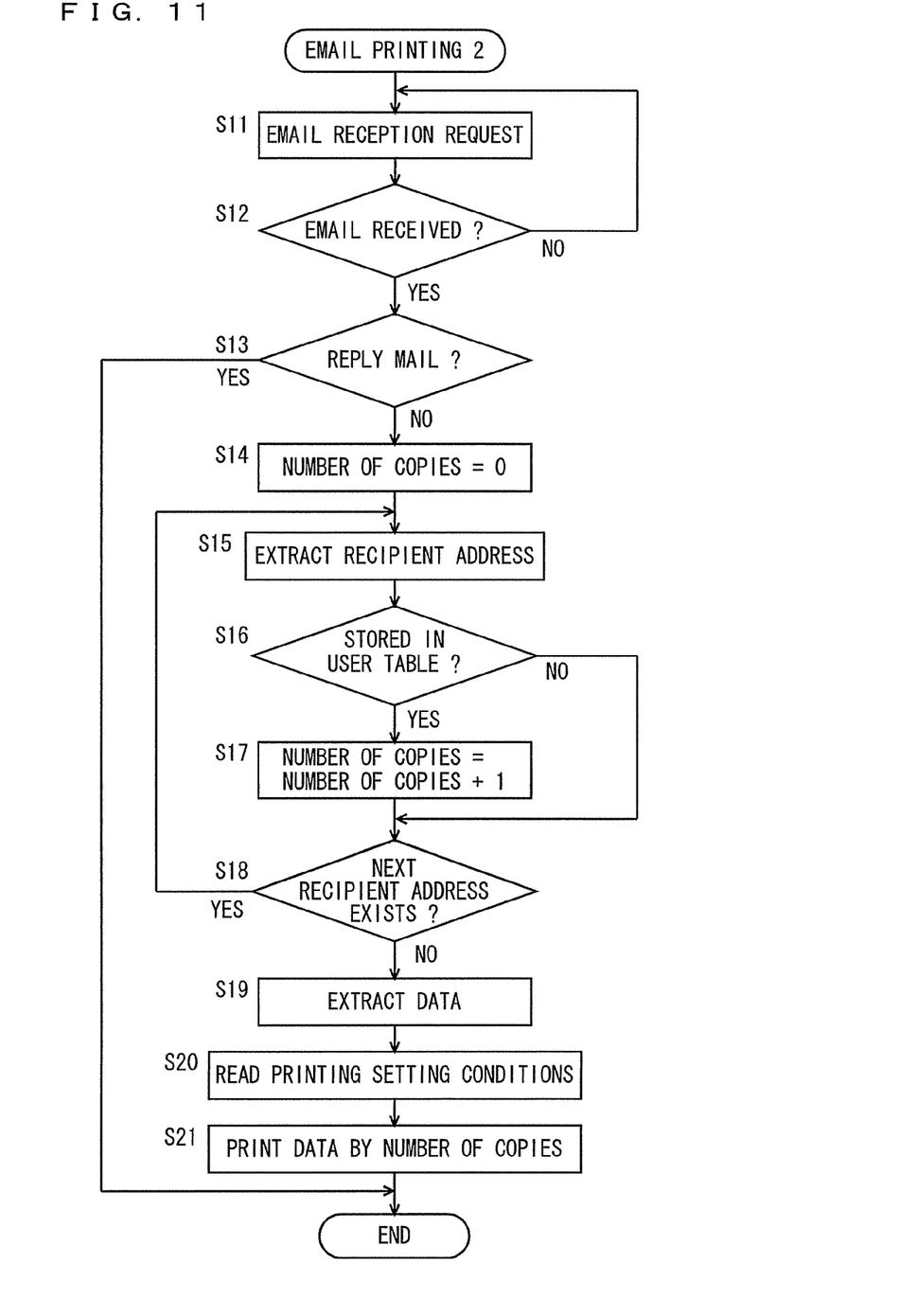
FIG. 11 is a second flowchart showing an exemplary flow of an email printing process.

FIG. 11 is a second flowchart showing an exemplary flow of an email printing process. Referring to FIG. 11, the processes in step S11-step S13 are identical to step S01-step S03 shown in FIG. 6, respectively, and therefore description thereof will not be repeated.

In step S14, the number of copies is set to 0. Then, one of the recipient addresses is extracted from an email (step S15). In addition, it is determined whether or not the email address identical to the extracted recipient address is stored in user table 171 (step S16). If stored in user table 171, the process proceeds to step S17. If not stored, step S17 is skipped and the process proceeds to step S18. In step S17, 1 is added to the number of copies, and the process proceeds to step S18. In step S18, it is determined whether or not there exists any unprocessed recipient address. If there exists an unprocessed recipient address, the process returns to step S15, and if not exist, the process proceeds to step S19. Since the email address assigned to the user registered in MFP 100 is stored in the user table, among the recipient addresses set in the email, the total number of recipient addresses having the identical email addresses registered in MFP 100 is set as the number of copies.

In step S19, data attached to the email is extracted. Then, the printing settings are read (step S20). The printing setting conditions associated by printing setting table 173 with the email address assigned to MFP 100, of the recipient addresses set in the email, are read. Then, the data extracted in step S19 is printed by the number of copies calculated by counting the recipient addresses in step S17, according to the printing settings read in step S20 (step S21). Thus, the distribution materials are printed by MFP 100 by the number of users registered in MFP 100, among the participants in the meeting. Also in MFP 100A, the email printing process shown in FIG. 11 is executed, so that the distribution materials are printed by MFP 100A by the number of users registered in MFP 100A, among the participants in the meeting.

In this manner, by transmitting an email having data of distribution materials attached thereto to participants in a meeting and to MFPs 100, 100A, the distribution materials are printed in MFP 100 by the number of users registered in MFP 100 among the participants in the meeting, and the distribution materials are printed in MFP 100A by the number of users registered in MFP 100A among the participants in the meeting. Therefore, a user need not perform an operation of instructing each of MFPs 100, 100A to print, in addition to the operation of transmitting an email. In addition, when an instruction to print is given to each of MFPs 100, 100A, the meeting participants belonging to the department in which MFP 100 is installed and the meeting participants belonging to the department in which MFP 100A is installed have to be respectively counted in order to determine the number of copies, and data to be printed by each of MFPs 100, 100A has to be designated. Therefore, data to be printed and the number of copies need not be designated for MFPs 100, 100A, thereby preventing erroneous selection of data to be printed and a mistake in the number of copies to be printed.

Moreover, a plurality of email addresses are assigned to MFP 100 and printing setting table 173 is stored which associates the printing setting conditions with each of a plurality of email addresses, so that MFP 100 prints under the printing conditions associated with the recipient address set in the received email. Therefore, the printing setting conditions for printing in MFP 100 can be selected by selecting any one of a plurality of emails assigned to MFP 100, at the time of creation of an email.

<Second Modification>

In print system 1 in a second modification, security is improved by allowing MFPs 100, 100A, 100B, 100C to restrict the respective data to be printed. Although MFPs 100, 100A, 100B, 100C in the first modification print all data attached to emails, MFPs 100, 100A, 100B, 100C in the second modification print only the data created by the sender of an email, of data attached to emails. Therefore, when the sender of the email attaches data created by someone else, that data is not printed.

Figure 12:
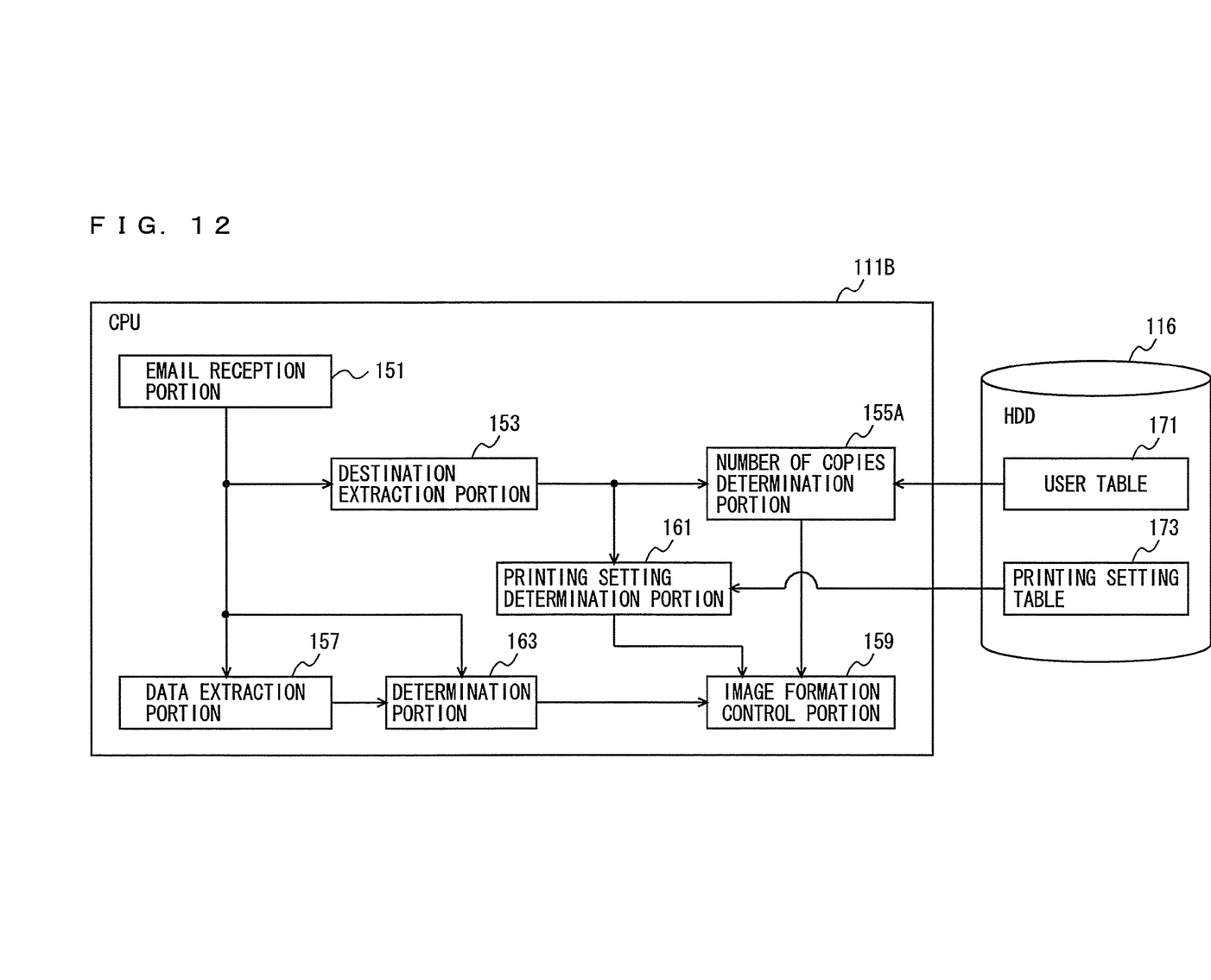
FIG. 12 is a functional block diagram showing an overall function of CPU included in MFP in a second modification together with data stored in HDD.

FIG. 12 is a functional block diagram showing an overall function of CPU included in MFP in the second modification together with the data stored in HDD. Referring to FIG. 12, a CPU 111B in the second modification differs from CPU 111A of MFP 100 in the first modification shown in FIG. 7 in that a determination portion 163 is added. The other functions are identical to the functions included in CPU 111A, and therefore description thereof will not be repeated here.

Determination portion 163 receives an email from email reception portion 151 and receives data extracted from the email from data extraction portion 157. Determination portion 163 extracts an originator address of the email by referring to the header of the email. Then, referring to the user table, the user ID associated with the email address identical to the originator address is obtained as the user ID of the sender of the email. Furthermore, determination portion 163 obtains creator information of the data as the user ID of the creator of the data by referring to the property of the data. If the user ID of the creator of the data is identical to the user ID of the sender of the email, determination portion 163 outputs the data to image formation control portion 159. If not identical, the data is not output to image formation control portion 159. When multiple pieces of data are input from data extraction portion 157, determination portion 163 compares the user ID of the creator of data with the user ID of the sender of the email, for each of multiple pieces of data.

Figure 13:
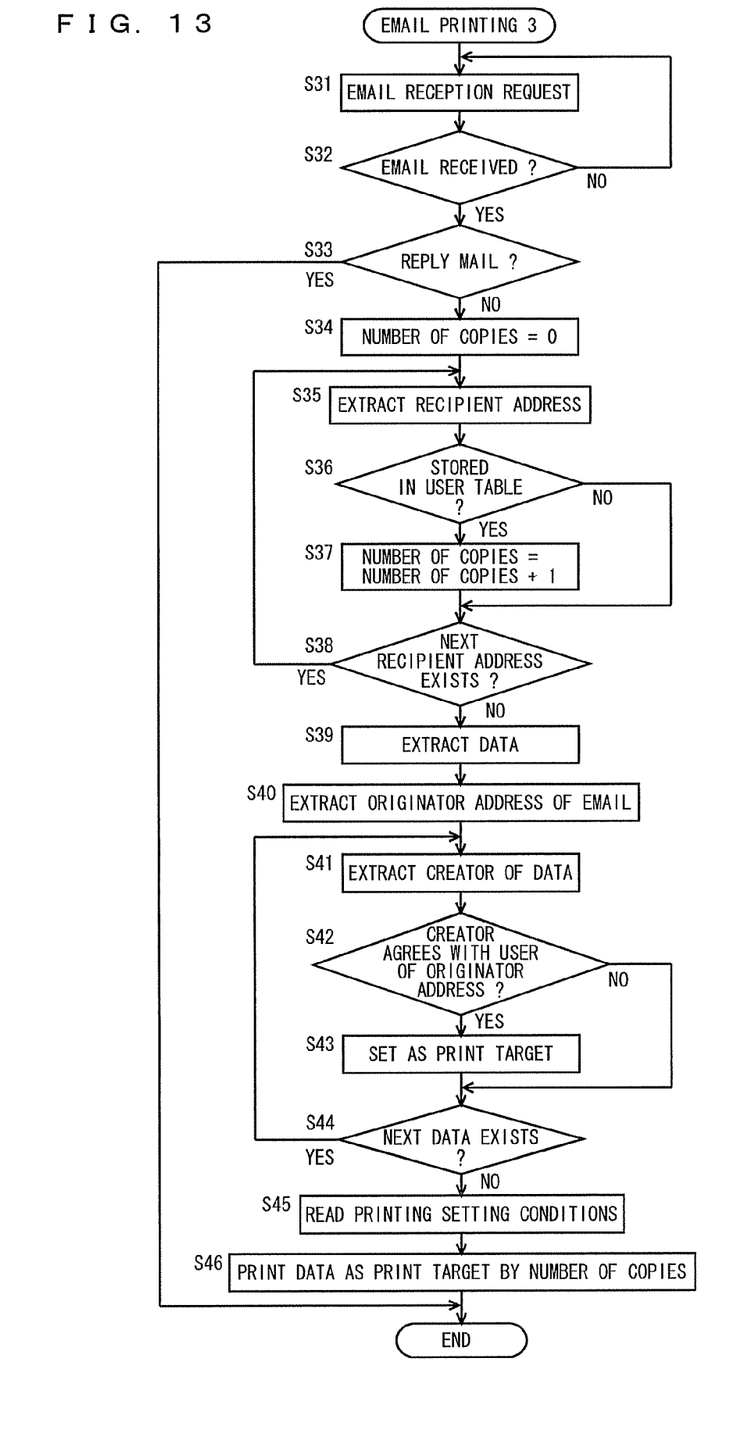
FIG. 13 is a third flowchart showing an exemplary flow of an email printing process.

FIG. 13 is a third flowchart showing an exemplary flow of an email printing process. Referring to FIG. 13, the processes in step S31-step S39 are identical to the processes in step S11-step S19 shown in FIG. 11, respectively, and therefore description thereof will not be repeated here.

In step S40, referring to the header of the email received in step S31, the originator address of the email is extracted. Then, referring to the user table, the user ID associated with the email address identical to the originator address is obtained as user ID of the sender of the email. In the next step S41, one of data extracted in step S39 is selected, and the creator of the data is extracted. Specifically, referring to the property of the selected data, the creator information of the data is obtained as user ID of the creator.

Next, it is determined whether or not the user ID of the creator of the data agrees with the user ID of the sender of the email (step S42). If both agree, the process proceeds to step S43. If not agree, step S43 is skipped and the process proceeds to step S44. In step S43, the data selected in step S41 is set as a print target.

In step S44, it is determined whether or not there exists data that has not yet been selected, among the data extracted in step S39. If there exists data not selected, the process returns to step S41, and if not exist, the process proceeds to step S45.

In step S45, the printing settings are read. The printing setting conditions associated by printing setting table 173 with the email address assigned to MFP 100, of the email addresses set as recipient addresses of the email received in step S31, are read. Then, the data set as a print target in step S43 is printed by the number of copies calculated by counting the recipient addresses in step S37, according to the printing settings read in step S45 (step S46).

In accordance with the second modification, among data attached to emails, only the data created by the sender of an email is printed, thereby preventing other people from printing the data. Therefore, printing of data without the creator knowing can be avoided, thereby improving security.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus having an assigned email address, comprising:
   a reception portion to receive an email;
   a number of copies determination portion to determine, based on destination information of said received email, a number of copies of data included in the email to print; and
   a print portion to print said data included in the email by said determined number of copies;
   wherein, when said received email is a reply mail, said print portion does not print said data included in the email.

2. The image formation apparatus according to claim 1, wherein said number of copies determination portion determines, as a number of copies, a value obtained by subtracting 1 from a number of destination addresses included in said received email.

3. The image formation apparatus according to claim 2, wherein the number of destination addresses included in said received email includes a number of destination addresses having a black carbon copy attribute.

4. An image formation program embodied on a computer readable medium for causing a computer to execute processing comprising the steps of:
   receiving an email;
   determining, based on destination information of said received email, a number of copies of data included in the email to print;
   printing said data included in the email by said determined number of copies;
   obtaining creator information of data included in said received email; and
   determining whether or not a creator of said data included in the email agrees with an originating user of said received email, wherein
   said step of printing prints said data on condition that it is determined that there is agreement in said step of determining.

5. An image formation apparatus having an assigned email address, comprising:
   a reception portion to receive an email;
   a number of copies determination portion to determine, based on destination information of said received email, a number of copies of data included in the email to print; and
   a print portion to print said data included in the email by said determined number of copies; and
   a user storage portion to store beforehand a user table including an email address assigned to a user, wherein
   said number of copies determination portion includes a counting portion to count a number of destination addresses stored as email addresses in said user table, among the destination addresses included in said received email.

6. The image formation apparatus according to claim 5, further comprising an apparatus storage portion to store beforehand an apparatus table including an email address assigned to an apparatus, wherein
   said counting portion counts a number of destination addresses that are not stored as email addresses in said apparatus table, among the destination addresses included in said received email.

7. An image formation apparatus having an assigned email address, comprising:
   a reception portion to receive an email;
   a number of copies determination portion to determine, based on destination information of said received email, a number of copies of data included in the email to print; and
   a print portion to print said data included in the email by said determined number of copies;
   a creator information obtaining portion to obtain creator information of data included in said received email; and
   a determination portion to determine whether or not a creator of said data included in the email agrees with an originating user of said received email, wherein
   said print portion prints said data on condition that said determination portion determines that there is agreement.

8. An image formation method comprising the steps of:
   receiving an email;
   determining, based on destination information of said received email, a number of copies of data included in the email to print; and
   using a printer to print said data included in the email by said determined number of copies;
   wherein, in said step of printing, when said received email is a reply mail, said data included in the email is not printed.

9. The image formation method according to claim 8, wherein said step of determining a number of copies includes the step of determining, as a number of copies, a value obtained by subtracting 1 from a number of destination addresses included in said received email.

10. The image formation method according to claim 9, wherein the number of destination addresses included in said received email includes a number of destination addresses having a black carbon copy attribute.

11. An image formation method comprising the steps of:
receiving an email;
determining, based on destination information of said received email, a number of copies of data included in the email to print; and
using a printer to print said data included in the email by said determined number of copies;
obtaining creator information of data included in said received email; and
determining whether or not a creator of said data included in the email agrees with an originating user of said received email, wherein
said step of printing prints said data on condition that it is determined that there is agreement in said step of determining.

12. An image formation method comprising the steps of:
receiving an email;
determining, based on destination information of said received email, a number of copies of data included in the email to print; and
using a printer to print said data included in the email by said determined number of copies;
wherein said step of determining a number of copies includes the step of referring to a user table including an email address assigned to a user and counting a number of destination addresses stored as email addresses in said user table, among the destination addresses included in said received email.

13. The image formation method according to claim 12, wherein said step of counting includes the step of referring to an apparatus table including an email address assigned to an apparatus and counting a number of destination addresses that are not stored as email addresses in said apparatus table, among the destination addresses included in said received email.

14. An image formation program embodied on a computer readable medium for causing a computer to execute processing including the steps of:
receiving an email;
determining, based on destination information of said received email, a number of copies of data included in the email to print; and
printing said data included in the email by said determined number of copies;
wherein, in said step of printing, when said received email is a reply mail, said data included in the email is not printed.

15. The image formation program according to claim 14, wherein said step of determining a number of copies includes the step of determining, as a number of copies, a value obtained by subtracting 1 from a number of destination addresses included in said received email.

16. The image formation program according to claim 15, wherein the number of destination addresses included in said received email includes a number of destination addresses having a black carbon copy attribute.

17. An image formation program embodied on a computer readable medium for causing a computer to execute processing including the steps of:
receiving an email;
determining, based on destination information of said received email, a number of copies of data included in the email to print; and
printing said data included in the email by said determined number of copies;
wherein said step of determining a number of copies includes the step of referring to a user table including an email address assigned to a user and counting a number of destination addresses stored as email addresses in said user table, among the destination addresses included in said received email.

18. The image formation program according to claim 17, wherein said step of counting includes the step of referring to an apparatus table including an email address assigned to an apparatus and counting a number of destination addresses that are not stored as email addresses in said apparatus table, among the destination addresses included in said received email.

* * * * *